(12) United States Patent
CaraDonna et al.

(10) Patent No.: US 10,229,010 B2
(45) Date of Patent: Mar. 12, 2019

(54) METHODS FOR PRESERVING STATE ACROSS A FAILURE AND DEVICES THEREOF

(71) Applicant: NetApp, Inc., Sunnyvale, CA (US)

(72) Inventors: Joseph CaraDonna, Ashland, MA (US); Donna Duffy, Arlington, MA (US); Brian McCarthy, Nashua, NH (US)

(73) Assignee: NetApp, Inc., Sunnyvale, CA (US)

( * ) Notice: Subject to any disclaimer, the term of this patent is extended or adjusted under 35 U.S.C. 154(b) by 98 days.

(21) Appl. No.: 15/359,827

(22) Filed: Nov. 23, 2016

(65) Prior Publication Data

US 2017/0075776 A1   Mar. 16, 2017

Related U.S. Application Data

(63) Continuation of application No. 14/316,273, filed on Jun. 26, 2014, now Pat. No. 9,507,674, which is a continuation-in-part of application No. 14/088,134, filed on Nov. 22, 2013.

(51) Int. Cl.
*G06F 11/00* (2006.01)
*G06F 11/14* (2006.01)
*G06F 11/07* (2006.01)

(52) U.S. Cl.
CPC ...... *G06F 11/1471* (2013.01); *G06F 11/0712* (2013.01); *G06F 11/1438* (2013.01); *G06F 11/1441* (2013.01); *G06F 2201/805* (2013.01); *G06F 2201/815* (2013.01); *G06F 2201/85* (2013.01)

(58) Field of Classification Search
CPC ............. G06F 11/1471; G06F 11/0712; G06F 11/1438; G06F 11/1441; G06F 11/073; G06F 11/0745; G06F 2201/805; G06F 2201/815; G06F 2201/85
See application file for complete search history.

(56) References Cited

U.S. PATENT DOCUMENTS

| | | |
|---|---|---|
| 7,409,587 B2 | 8/2008 | Perry |
| 8,078,622 B2 | 12/2011 | Rabii et al. |
| 8,788,873 B2 | 7/2014 | Galles et al. |
| 2003/0018927 A1 | 1/2003 | Gadir et al. |
| 2006/0212644 A1 | 9/2006 | Acton et al. |

(Continued)

*Primary Examiner* — Joseph D Manoskey
(74) *Attorney, Agent, or Firm* — LeClairRyan PLLC

(57) ABSTRACT

A method, non-transitory computer readable medium, and computing device that determines when a software failure associated with a virtual storage controller has occurred. At least a portion of a transaction log corresponding to the virtual storage controller is stored in a stable storage device, when the determining indicates that the software failure associated with the virtual storage controller has occurred. A determination is made when the virtual storage controller has rebooted. The at least a portion of the transaction log is retrieved from the stable storage device, when the determining indicates that the virtual storage controller has rebooted. Thereby, state can be preserved and transactions pending, but not yet committed to storage server devices, can be replayed and proceed with minimal or no impact on the client devices originating the transactions.

18 Claims, 3 Drawing Sheets

(56) References Cited

U.S. PATENT DOCUMENTS

| | | | |
|---|---|---|---|
| 2006/0259650 A1* | 11/2006 | Chou | G06F 3/0613 710/8 |
| 2010/0250832 A1 | 9/2010 | Zhang et al. | |
| 2013/0151653 A1* | 6/2013 | Sawicki | G06F 15/17331 709/216 |
| 2014/0281453 A1* | 9/2014 | Friedman | G06F 11/1417 713/2 |

* cited by examiner

METHODS FOR PRESERVING STATE ACROSS A FAILURE AND DEVICES THEREOF

This application is a continuation of prior U.S. patent application Ser. No. 14/316,273, filed Jun. 26, 2014, which is a continuation-in-part of U.S. patent application Ser. No. 14/088,134, filed Nov. 22, 2013, each of which is hereby incorporated by reference in its entirety.

FIELD

This technology generally relates to storage systems and, more particularly, to methods and devices for preserving state stored by a virtual storage controller across a failure.

BACKGROUND

A storage fabric may include multiple storage controllers to store and manage data on behalf of client devices. A storage controller may be a physical device or virtual appliance (also referred to herein as a virtual storage controller), each with their own instance of an operating system. The operating system may operate independently as a single node, or coordinate a cluster of nodes as a single system.

A physical storage controller in a storage fabric can utilize non-volatile memory to store critical state (e.g., a transaction log for write transactions which are staged prior to being committed to disk) in the physical storage controller device. Since the memory is non-volatile, the stored information will persist should there be a failure in order to allow the critical state, including any pending write transactions at the time of the failure for example, to be maintained.

However a virtual storage controller in the storage fabric may not have access to suitable non-volatile memory of a host device on which the virtual storage controller is executing. Alternatively, access to suitable non-volatile memory may be complex and/or difficult to obtain and/or manage and may be different for various providers of host devices.

Accordingly, critical state, such as a transaction log in one example, is maintained by each of the virtual storage controllers in a volatile memory and is synchronously flushed to a persistent or non-volatile data storage device, such as a disk on one of the storage server devices in the storage fabric, in order to allow the virtual storage controllers to maintain the critical state. However, the synchronous flushing of transaction log information is expensive and limits the speed with which the virtual storage controllers can perform write operations, which is undesirable.

DETAILED DESCRIPTION

Figure 1:
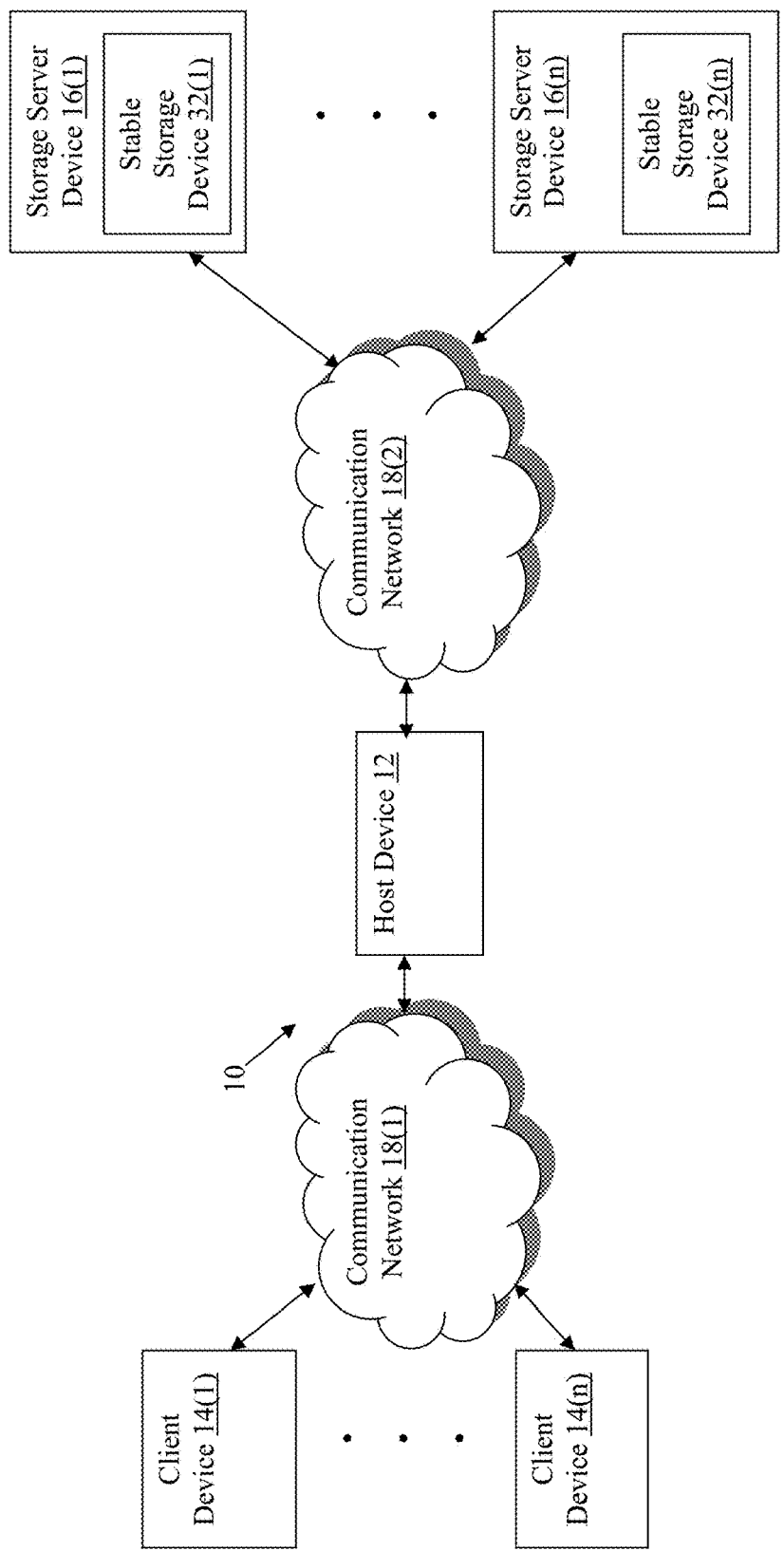
FIG. 1 is a block diagram of a network environment with a storage fabric which incorporates an exemplary host device.

A network environment 10 illustrating a storage fabric with an exemplary host device 12 is illustrated in FIG. 1. The environment 10 further includes client devices 14(1)-14(n), and storage server devices 16(1)-16(n), although this environment 10 can include other numbers and types of systems, devices, components, and/or elements in other configurations, such as multiple numbers of each of these apparatuses and devices. The client computing devices 14(1)-14(n) are in communication with the host device 12 through communication network 18(1) and the host device 12 is in communication with the storage server devices 16(1)-16(n) through communication network 18(2). The communication networks 18(1) and 18(2) can be local area networks (LANs), wide area networks (WANs), or combination thereof, for example. This technology provides a number of advantages including methods, non-transitory computer readable medium, and devices that facilitate the preservation of critical state across a software failure allowing transactions to be replayed.

Each of the client devices 14(1)-14(n) in this example can include a processor, a memory, a communication interface, an input device, and a display device, which are coupled together by a bus or other link, although each of the client devices can have other types and numbers of components or other elements and other numbers and types of network devices could be used. The client devices 14(1)-14(n) may run interface applications that provide an interface to make requests for and send content and/or data to the host device 12 via the communication network 18(1), for example. Each of the client devices 14(1)-14(n) may be, for example, a conventional personal computer (PC), a workstation, a smart phone, a virtual machine, or other processing and/or computing device.

Each of the storage server devices 16(1)-16(n) in this example include, a stable storage device 32(1)-32(n), a processor, and a network interface coupled together by a bus or other link. The stable storage device 32(1)-32(n) in this example can include conventional magnetic disks or any other type of storage device suitable for storing large quantities of data. The storage server devices 16(1)-16(n) may be organized into one or more volumes of Redundant Array of Inexpensive Disks (RAID), although other types and numbers of storage server devices in other arrangements can be used.

The host device 12 in this example operates on behalf of the client devices 14(1)-14(n) to store and manage shared files or other units of data in the storage server devices 16(1)-16(n). Accordingly, the host device 12 also manages the storage server devices 16(1)-16(n) in this example and receives and responds to various read and write requests from the client devices 14(1)-14(n), directed to data stored in, or to be stored in, one or more of the storage server devices 16(1)-16(n).

Figure 2:
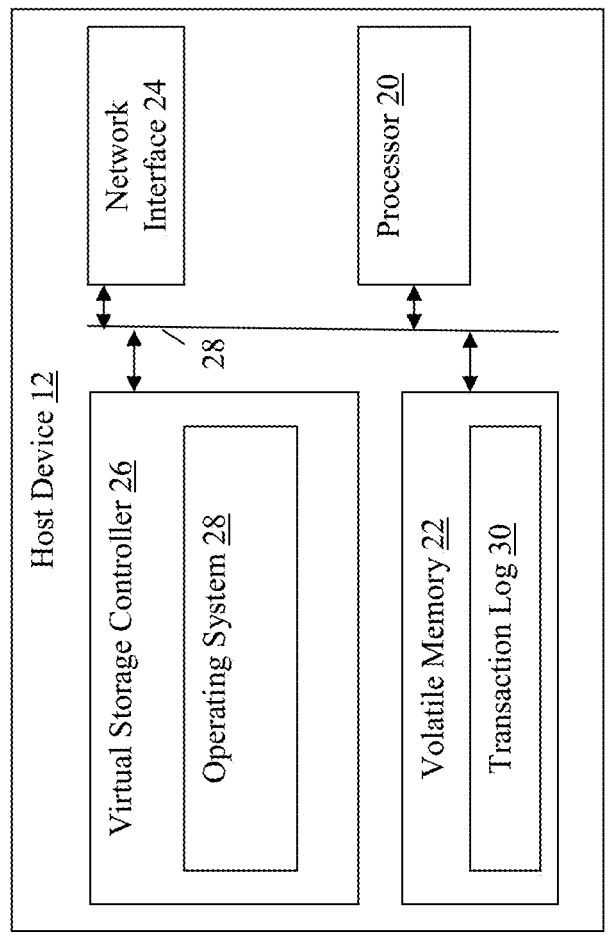
FIG. 2 a block diagram of the exemplary host device.

Referring more specifically to FIG. 2, a block diagram of the exemplary host device 12 is illustrated. In this example, the host device 12 includes a processor 20, a volatile memory 22, a network interface 24, and a virtual storage controller 26, coupled together by a bus 28 or other communication link. In this example, the bus 26 is a Peripheral Component Interface (PCI), although other bus types and links may be used.

The processor 20 of the host device 12 may execute one or more programmed instructions stored in a memory of the host device 12 for the functions and/or other operations illustrated and described herein. For example, the memory can store instructions comprising a system operating system that when executed by the processor 20 generates a hypervisor that interfaces hardware of the host device 12 with the virtual storage controller 26, such as through a virtual machine, for example, although the virtual storage controller 26 can be executed and implemented in other manners. The processor 20 of the host device 12 may include one or more central processing units and/or general purpose processors with one or more processing cores, for example.

The volatile memory 22 of the host device 12 may include any of various forms of random access memory (RAM), for example. In this example, the virtual storage controller 26 does not have access, or an interface, to a non-volatile memory or other stable storage device that may be present on the host device 12. In some examples, the virtual storage controller 26 is provided by a different vendor than that of the host device 12 and specific aspects of the integration may not be available in order to provide a suitable interface to a stable storage device.

Accordingly, the volatile memory 22 in this example stores a transaction log 30, as described and illustrated in more detail later, although the memory can store other types and amounts of other data, including other critical state information. The transaction log 30 in this example is used by the virtual storage controller 26 to stage write transactions received from the client devices 14(1)-14(n) prior to committing the write transactions to the storage server devices 16(1)-16(n), as described and illustrated in more detail later. In other examples, the transaction log 30 can be used by the operating system 28 to store a support log and, in yet other examples, the transaction log is used to store other natively-generated transactions. The transaction log 30 can also be used to store other types and numbers of transactions and other critical state information.

The network interface 24 of the host device 12 in this example can be an Ethernet adapter, for example, operatively coupling and communicating between the host device 12 and the client devices 14(1)-14(n), which are coupled together by the communication network 18(1), although other types and numbers of communication networks or systems with other types and numbers of connections and configurations to other devices and elements also can be used.

By way of example only, the communication networks 18(1) and 18(2) can use TCP/IP over Ethernet and industry-standard protocols, including NFS, CIFS, SOAP, XML, LDAP, and SNMP, although other types and numbers of communication networks, can be used. The communication networks 18(1) and 18(2) in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication networks 18(1) and 18(2) may also comprise any wide area network (e.g., Internet), although any other type of traffic network topology may be used.

Although examples of the host device 12, client devices 14(1)-14(n), and storage server devices 16(1)-16(n) are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
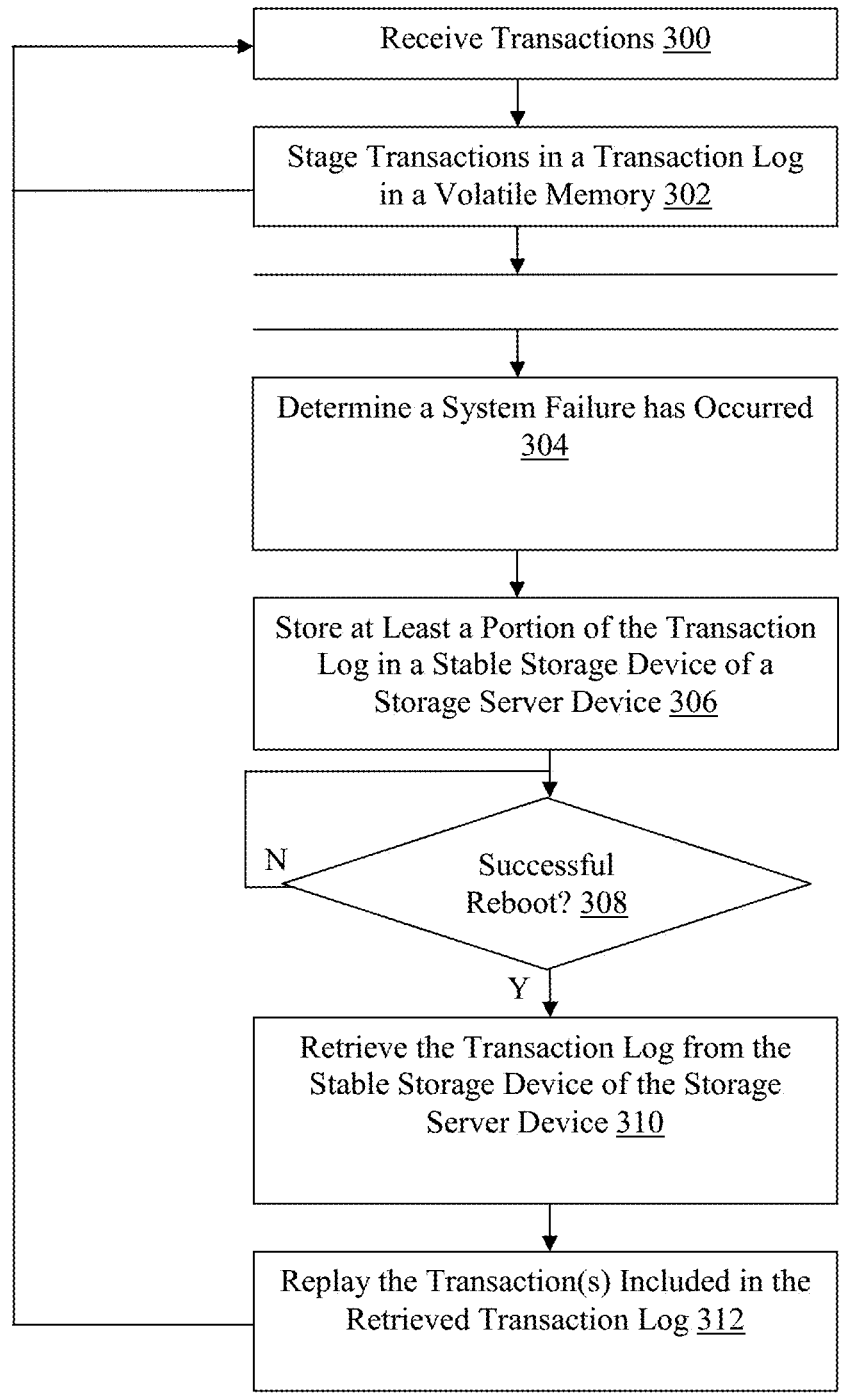
FIG. 3 is a flowchart of an exemplary method for preserving state across a failure.

An exemplary method for preserving state across a failure will now be described with reference to FIGS. 1-3. Referring more specifically to FIG. 3, in step 300 in this example, the virtual storage controller 26 executing on the host device 12 receives transactions, such as natively-generated transaction(s) from the operating system 28 and/or write transaction(s) from one or more of the client devices 14(1)-14(n), for example. In one example, the transactions can include requests from the operating system 28 to store support information on one or more of the storage server devices 16(1)-16(n). In another example, the transactions received from the client devices 14(1)-14(n) can be requests from the client devices 14(1)-14(n) to store information on one or more of the storage server devices 16(1)-16(n). Other types and/or numbers of transactions may be received in step 300.

In step 302 in this example, the virtual storage controller 26 executing on the host device 12 stages the received transactions and stores information associated with the transactions in the transaction log 30. As described and illustrated earlier, the transaction log 30 can be stored in the volatile memory 22 of the host device 12. Accordingly, the state of the virtual storage controller 26 is stored in the transaction log 30. In this example, the state includes the transactions and other contextual information and/or metadata, if any, useful for subsequent processing of the transactions, although other types and/or amounts of information may be included in the state of the virtual storage controller 26. In this example, the transactions are staged because they may be received more quickly than they can be processed by the virtual storage controller 26. Generally, processing and committing the transactions to the storage server devices 16(1)-16(n) requires a relatively long period of time considering the mechanical nature of the operation of storing data on disks of the storage server devices 16(1)-16(n). Following the staging of transactions in the transaction log 30, the virtual storage controller 26 continued receiving transactions in step 300, as described and illustrated earlier.

Additionally, in parallel and asynchronously, the virtual storage controller 26 executing on the host device 12 in this example determines a system failure has occurred in step 304. By way of example only, the operating system associated with the virtual storage controller 26 can determine a software failure has occurred when the system enters a panic state, although other types and/or numbers of situations could occur that also result in determining a failure has occurred.

Following a determination by the virtual storage controller 26 executing on the host device 12 that there has been a failure, in step 306 in this example, the virtual storage controller 26 executing on the host device 12 stores the state including at least a portion of the associated transaction log 30 in a stable storage device, such as one or more of the stable storage devices 32(1)-32(n) of one or more of the storage server devices 16(1)-16(n). While the virtual storage controller 26 may not have access to other non-volatile memory that may be present on the host device 12, it does have access to a stable storage device 32(1)-32(n) of each of the storage server devices 16(1)-16(n) with which it communicates to process transactions. However, in other examples, other locations for preserving the transaction log 30 can also be used including a local storage drive attached to the host device 12 or an off-box transaction log database service, for example.

Accordingly, the virtual storage controller 26, or more specifically the operating system 28, can be configured to automatically store at least a portion of the current contents of the associated transaction log 30 in a default or preselected stable storage device 32(1)-32(n) of one or more of the storage server devices 16(1)-16(n) upon detecting entry into a software failure. By flushing the transaction log 30 upon detecting entry into a software failure into a stable storage device 32(1)-32(n) of one or more of the storage server devices 16(1)-16(n), the virtual storage controller 26 can preserve its state and, in particular, information associated with transaction(s) currently pending at the time of the failure.

In step 308, the virtual storage controller 26 executing on the host device 12 determines whether the associated operating system 28 has successfully rebooted, although other approaches for identifying a successful reboot may be used. If the virtual storage controller 26 determines that it has not successfully rebooted, then the No branch is taken back to step 312 and the virtual storage controller 26 effectively waits for the operating system 28 to reboot successfully. If the virtual storage controller 26 determines that it has successfully rebooted, then the Yes branch is taken to step 314.

In step 310, the virtual storage controller 26 executing on the host device 12 retrieves the associated transaction log 30 from the stable storage device 32(1)-32(n) of the one or more of the storage server devices 16(1)-16(n) at which the information was stored in step 310. Accordingly, the virtual storage controller 26 can be configured to automatically retrieve the state information, including previously stored information associated with pending transactions from the retrieved transaction log 30, upon successfully rebooting subsequent to a failure.

In this example, the volatile memory 22 that stores the associated transaction log 30 will have been erased during the rebooting of the virtual storage controller 26. However, the information associated with the pending transaction(s) in the transaction log 30 was stored, in step 310 in this example, in a stable storage device 32(1)-32(n) of the one or more of the storage server devices 16(1)-16(n). As the stable storage device 32(1)-32(n) of the one or more of the storage server devices 16(1)-16(n) will not be erased as a result of the reboot, the state of the virtual storage controller 26 can thereby be preserved.

Accordingly, in step 312 in this example, the virtual storage controller 26 executing on the host device 12 replays the transaction(s) in the transaction log 30 proximate to the time of the failure, as retrieved in step 314. By replaying the transactions, data sent by one or more of the client devices 14(1)-14(n) to the virtual storage controller 26 can be committed to one or more of the storage server devices 16(1)-16(n) with reduced or no impact on the client devices 14(1)-14(n) as a result of the failure of the one of the virtual storage controllers 34(1)-34(n). Additionally, other transactions, including transactions natively generated by the operating system 28, can also advantageously be replayed in step 316.

With this technology, a virtual storage controller that does not have suitable access to non-volatile memory of a host device can flush pending transaction(s) upon failure to a stable storage device. Accordingly, upon rebooting and erasing a transaction log, information associated with the transactions can be retrieved from the stable storage device and advantageously replayed thereby preserving the state of the virtual storage controller across a failure. By preserving the state across a failure, the experience of client devices, for example, originating transactions is advantageously improved as the transactions pending upon the failure of the virtual storage controller are able to be committed to stable storage device(s) rather than dropped resulting in an error message and/or data loss. Additionally, performance is improved with this technology as a result of the asynchronous preservation of transactions. Since transactions are preserved asynchronously and upon failure, the expense of writing each individual transaction to stable storage upon processing the transaction is not incurred and transactions can therefore be processed relatively quickly.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    storing, by a computing device, at least a portion of a transaction log corresponding to a virtual storage controller executing on the computing device in a non-volatile storage device of a storage server device remote from the computing device when a software failure associated with the virtual storage controller has occurred; and
    retrieving, by the computing device, the at least a portion of the transaction log from the non-volatile storage device when the virtual storage controller has rebooted.

2. The method of claim 1, further comprising storing, by the computing device, one or more received transactions in the transaction log in a volatile memory.

3. The method of claim 2, further comprising migrating, by the computing device, the one or more transactions from the volatile memory to the non-volatile storage device when the software failure associated with the virtual storage controller has occurred.

4. The method of claim 2, wherein the volatile memory is local to the computing device.

5. The method of claim 1, further comprising replaying, by the computing device, one or more write transactions included in the at least a portion of the transaction log when the virtual storage controller has rebooted.

6. The method of claim 1, further comprising storing, by the computing device, the at least a portion of the transaction log when the software failure has occurred subsequent to receipt of one or more transactions by the virtual storage controller.

7. A non-transitory machine readable medium having stored thereon instructions for preserving state across a failure comprising machine executable code which when executed by at least one machine, causes the machine to:
    store at least a portion of a transaction log corresponding to a virtual storage controller executing on a computing device in a non-volatile storage device of a storage server device remote from the computing device when a software failure associated with the virtual storage controller has occurred; and retrieve the at least a portion of the transaction log from the non-volatile storage device when the virtual storage controller has rebooted.

8. The non-transitory machine readable medium of claim 7, wherein the machine executable code when executed by the machine further causes the machine to store one or more received transactions in the transaction log in a volatile memory.

9. The non-transitory machine readable medium of claim 8, wherein the machine executable code when executed by the machine further causes the machine to migrate the one or more transactions from the volatile memory to the non-volatile storage device when the software failure associated with the virtual storage controller has occurred.

10. The non-transitory machine readable medium of claim 8, wherein the volatile memory is local to the computing device.

11. The non-transitory machine readable medium of claim 7, wherein the machine executable code when executed by the machine further causes the machine to replay one or more write transactions included in the at least a portion of the transaction log when the virtual storage controller has rebooted.

12. The non-transitory machine readable medium of claim 7, wherein the machine executable code when executed by the machine further causes the machine to store the at least a portion of the transaction log when the software failure has occurred subsequent to receipt of one or more transactions by the virtual storage controller.

13. A computing device, comprising:
 a memory containing machine readable medium comprising machine executable code having stored thereon instructions for preserving state across a failure; and
 a processor coupled to the memory, the processor configured to execute the machine executable code to cause the processor to:
  store at least a portion of a transaction log corresponding to a virtual storage controller executing on the computing device in a non-volatile storage device of a storage server device remote from the computing device when a software failure associated with the virtual storage controller has occurred; and
  retrieve the at least a portion of the transaction log from the non-volatile storage device when the virtual storage controller has rebooted.

14. The computing device of claim 13, wherein the processor coupled to the memory is further configured to execute the machine executable code to cause the processor to store one or more received transactions in the transaction log in a volatile memory.

15. The computing device of claim 14, wherein the processor coupled to the memory is further configured to execute the machine executable code to cause the processor to migrate the one or more transactions from the volatile memory to the non-volatile storage device when the software failure associated with the virtual storage controller has occurred.

16. The computing device of claim 14, wherein the volatile memory is local to the computing device.

17. The computing device of claim 13, wherein the processor coupled to the memory is further configured to execute the machine executable code to cause the processor to replay one or more write transactions included in the at least a portion of the transaction log when the virtual storage controller has rebooted.

18. The computing device of claim 13, wherein the processor coupled to the memory is further configured to execute the machine executable code to cause the processor to store the at least a portion of the transaction log when the software failure has occurred subsequent to receipt of one or more transactions by the virtual storage controller.

* * * * *